Figure 10:
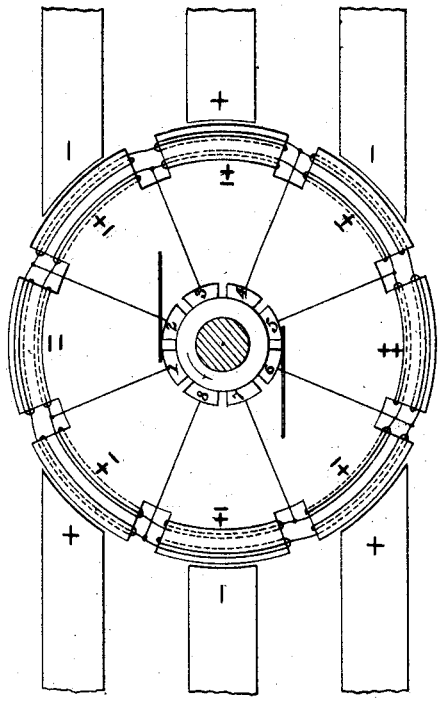

(No Model.) 3 Sheets—Sheet 1.
S. C. C. CURRIE.
ELECTRIC MOTOR.
No. 419,245. Patented Jan. 14, 1890.
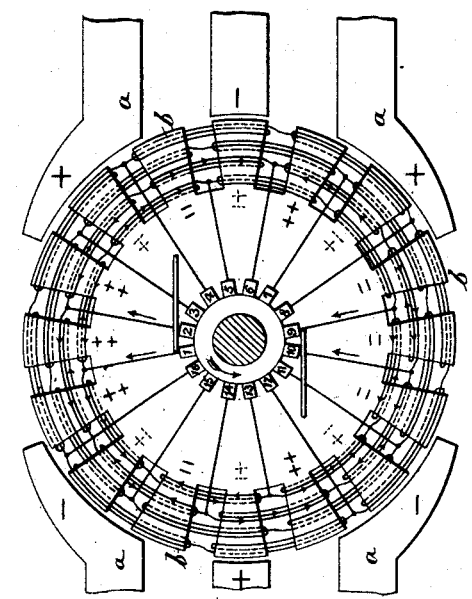
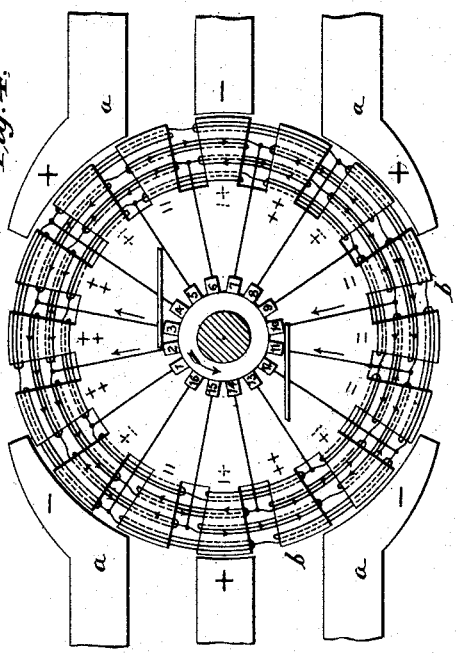
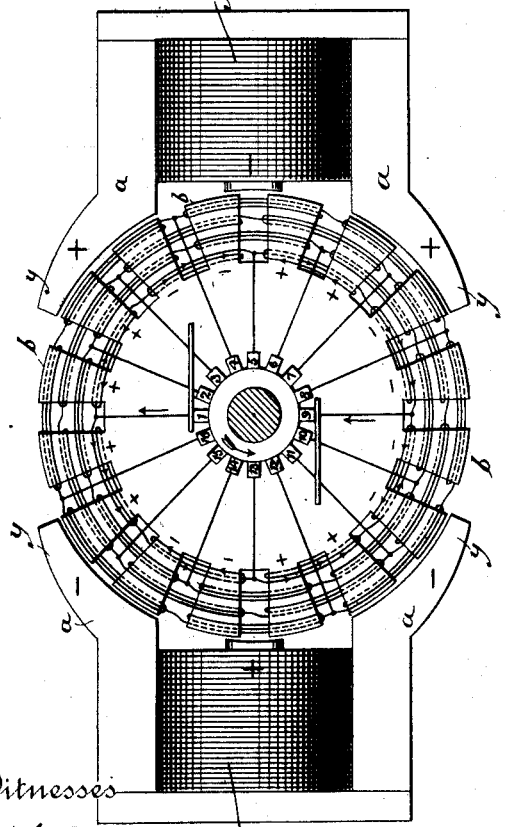
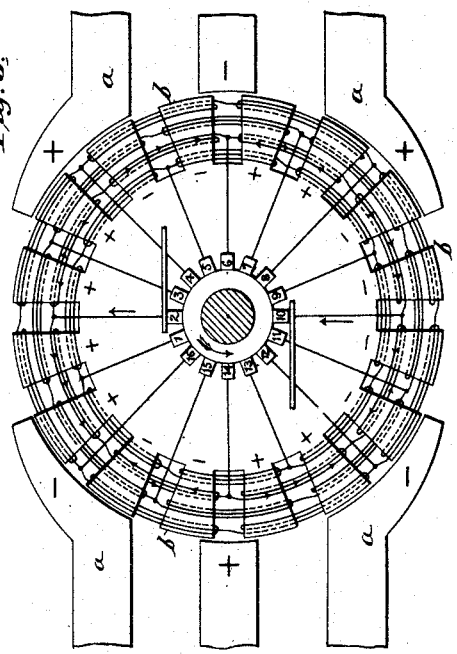
Witnesses
Geo. W. Breck
Edward Thorpe
Inventor
Stanley C. C. Currie
By his Attorneys
Baldwin, Davidson & Wight (No Model.) 3 Sheets—Sheet 2.
S. C. C. CURRIE.
ELECTRIC MOTOR.
No. 419,245. Patented Jan. 14, 1890.
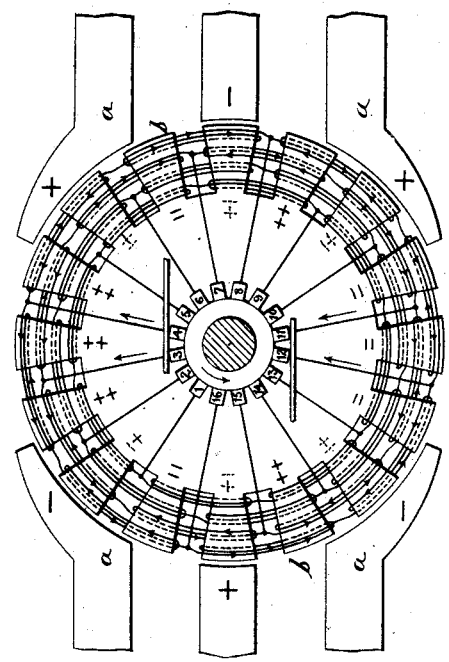
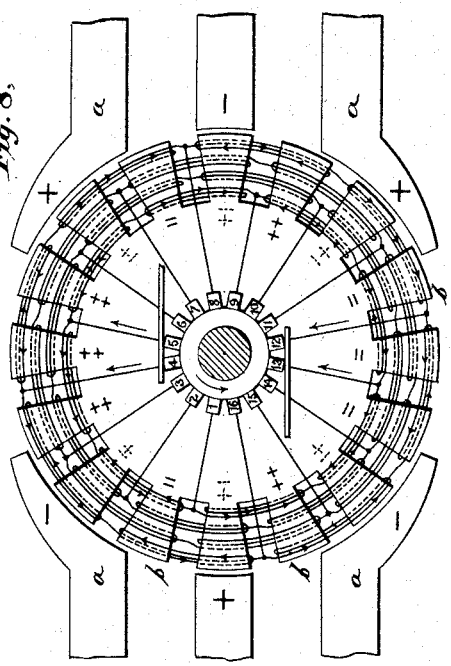
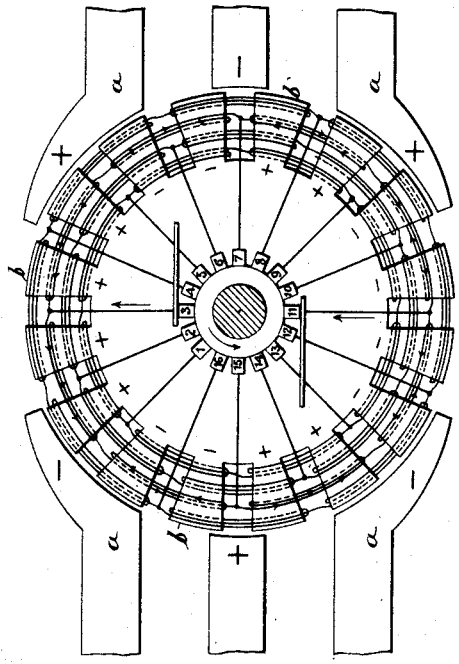
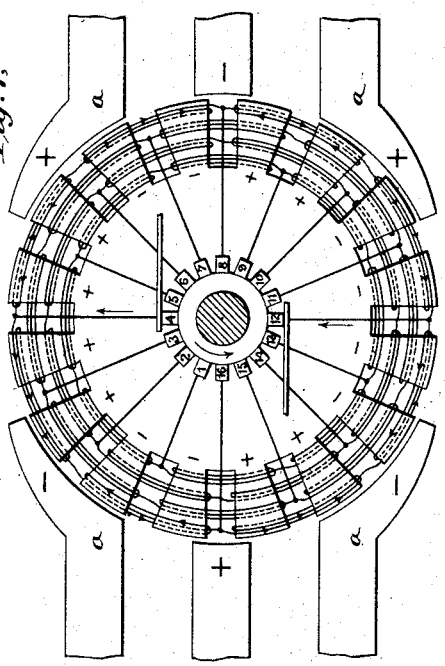
Witnesses
Geo. W. Breck.
Edward Thorpe.
Inventor
Stanley C. C. Currie
By his Attorneys
Baldwin, Davidson & Wight (No Model.)

S. C. C. CURRIE.
ELECTRIC MOTOR.

No. 419,245. Patented Jan. 14, 1890.

Witnesses
H. C. Newman
E. S. Newman

Inventor
Stanley C. C. Currie
By his Attorneys
Baldwin, Davidson & Wight

UNITED STATES PATENT OFFICE.

STANLEY C. C. CURRIE, OF PHILADELPHIA, PENNSYLVANIA, ASSIGNOR TO THE UNITED ELECTRIC IMPROVEMENT COMPANY, OF GLOUCESTER CITY, NEW JERSEY.

ELECTRIC MOTOR.

SPECIFICATION forming part of Letters Patent No. 419,245, dated January 14, 1890.

Application filed July 25, 1889. Serial No. 318,672. (No model.)

*To all whom it may concern:*

Be it known that I, STANLEY C. C. CURRIE, of Philadelphia, Pennsylvania, have invented certain new and useful Improvements in Electric Motors, of which the following is a specification.

The object of my invention is to increase the efficiency and improve the operation of electric motors. By my improvements I obtain a constant and even torsion, an equal distribution of forces at all periods of revolution, and avoid dead-points. To this end I employ multiple field-poles and cause the changes of polarity in the poles of the armature to pass from + to neutral and then to —, and vice versa.

In the accompanying drawings, Figures 1, 2, 3, 4, 5, 6, 7, and 8 are diagram views illustrating different positions of a motor having sixteen commutator-bars, sixteen armature-poles, and four series of windings. Figs. 9, 10, 11, and 12 are similar views of a motor having eight commutator-bars and two series of windings.

The machine illustrated comprises two field-magnets of three poles each arranged on opposite sides of a cylindrical armature. On one side the center field-magnet pole is, say, of + sign and the two outside ones —, and on the opposite side of the central pole is — and the outside ones +; in other words, opposite poles are of unlike polarity. The armature indicated in the diagram is of a cylindrical toothed type. Each set of field-magnets consists of one coil A, wound upon the central core, Fig. 1, and two exterior poles a.

Referring to Figs. 1 to 8, the armature is provided with sixteen poles b, and they are wound throughout with four distinct series or sets of windings. The first set of windings, or that nearest the commutator, is connected with commutator-bars 1 5 9 13. The second set is connected with the bars 2 6 10 14; the third set with the bars 3, 7, 11, and 15; the fourth set with the bars 4 8 12 16.

Each winding comprises a series of coils, and each coil envelops two poles of the armature, adjoining pairs of poles being wound in different directions and the wires connected between coils with their proper commutator-bars. The coils of one winding are opposite the spaces between the coils of adjacent windings; in other words, the coils of the second layer or series of windings embrace adjoining cores included in the different coils of the first winding. The coils of the third winding embrace adjoining cores included in different coils of the second winding, and the coils of the fourth winding are similarly related to those of the third.

To explain more specifically, starting from commutator-bar No. 1, the wire extends in both directions and is coiled in a reverse sense around adjoining pairs of poles, connections being made between coils with the commutator-bars 1 5, &c. Starting from bar 2 the wire passes between two poles enveloped by a coil of the first winding, extends in both directions, and is wound in a reverse sense around adjoining pairs of poles, connections being made between the coils with the bars 2 6, &c. When the brushes are on bars connected with the first winding—for instance, upon bars 1 and 9 in Fig. 1—the first winding only is in circuit and the polarities of the armature will be as indicated—that is, the four poles at the top of the armature will be +, the four poles at the bottom of the armature will be —, and on each side of the armature the two poles nearest the bottom — poles will be + and the two nearest the top + poles will be —. When the brushes are upon bars 1 and 2 and 9 and 10, Fig. 2, the three top poles will be +, and then, looking to the left in the direction of rotation, the poles will be neutral, minus, neutral, plus, neutral, minus, minus, minus, neutral, plus, neutral, minus, neutral. The signs + and — on the inside of the windings of course indicate the polarities at the circumference of the armature. In each case it will be perceived that the polarities are such as to cause the revolution of the armature with a practically even torsion or strain.

In Fig. 3 the brushes are upon bars connected with the second winding; in Fig. 4, with the second and third windings; in Fig. 5, with the third winding only; in Fig. 6, with the third and fourth; in Fig. 7, with the fourth only, and in Fig. 8 with the fourth and fifth. From these diagrams it is clear that each pole of the armature in passing from − or + becomes first neutral during one portion or stage of the revolution and then of the opposite polarity. When the brushes throw two windings into action, as in Figs. 2, 4, 6, and 8, the armature is doubly magnetized at top and bottom between the field-poles, whereas those points directly opposite the poles are neutral and those on each side between the middle and upper and lower field-poles are active and of a polarity to be attracted in the direction of rotation. The course of the current in all the winding is shown by the arrow-heads. I prefer to extend the upper and lower field-poles concentrically with the armature, as indicated at $y$, to afford full opportunity for action between these poles and the armature. Of course this method of winding may be applied to armatures of any suitable type.

Figure 12:
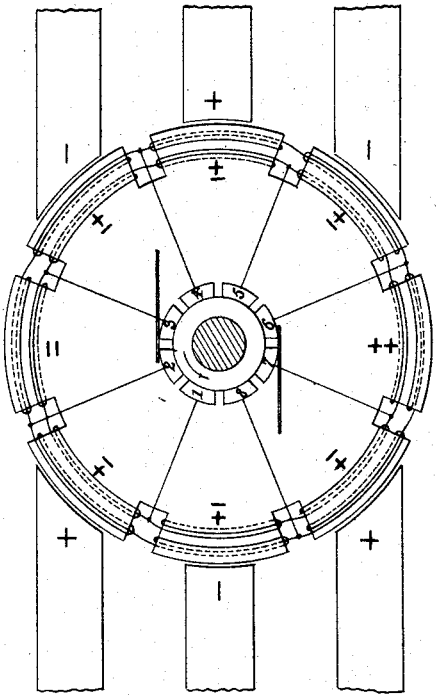
Figure 9:
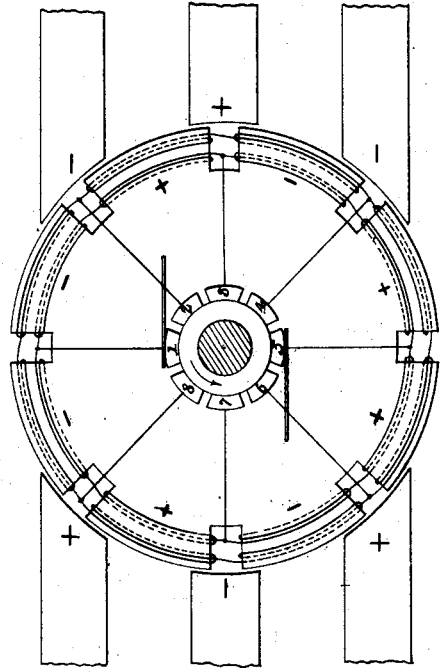
Figure 11:
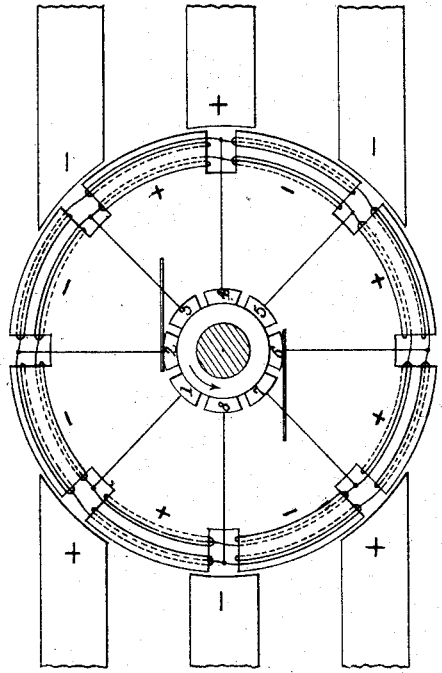

In Figs. 9, 10, 11, and 12 I have shown the application of my invention to a motor having eight commutator-bars and two sets of winding, each winding being connected with alternate bars in the commutator. The armature has eight poles, and each pole is wound with a coil of each winding, adjoining coils in each winding being wound in a reverse sense, and on each pole the coils of the second winding are wound reversely to those of the first. In Figs. 10 and 12, where both windings are in circuit, the upper and lower poles are respectively doubly magnetized minus and plus, while the intermediate poles are neutral.

The polarities in the different positions of the armature are plainly marked in the drawings, which speak for themselves, and more specific description seems unnecessary.

In this form of machine, as well as in that shown in other figures of the drawings, the armature-poles, either + or −, are for a portion of a revolution neutral before becoming of opposite polarity.

I claim as my invention—

1. The combination, with opposite sets of field-magnet poles, each having a middle pole of given polarity and outside poles of opposite polarity, unlike poles in the two sets being opposite each other, of an interposed multipolar armature wound with independent circuits, each winding or circuit consisting of a series of coils wound alternately in reverse direction, and the commutator-bars and brushes, substantially as set forth.

2. The combination, with opposite sets of field-magnet poles, each having a middle pole of given polarity and outside poles of opposite polarity, unlike poles in the two sets of field-magnets being opposite each other, of an interposed multipolar armature having independent windings, each connected with its commutator-bars, each winding consisting of a series of coils wound in a reverse sense around adjoining pairs of poles, and each pair of poles included in a coil of one circuit being poles included in different coils of another circuit, substantially as set forth.

3. A multipolar armature having multiple windings, each of which is connected with its commutator-bars, and each consisting of a series of coils wound in a reverse sense around adjoining pairs of poles, and each pair of poles included in a coil of one winding being adjoining poles included in different coils of another winding, substantially as set forth.

4. In an electric motor, the combination, with the field-magnets, of the multipolar armature, the poles of which are each independently wound in different circuits, and the commutator, with the bars of which the armature-circuits are connected, substantially as set forth.

5. In an electric motor, the combination, substantially as set forth, of the field-magnets, the multipolar armature having independent windings traversing all the poles of the armature, each winding consisting of coils alternately reversely wound, and the commutator, with equidistant bars of which each circuit or winding is connected, in the manner described.

In testimony whereof I have hereunto subscribed my name.

STANLEY C. C. CURRIE.

Witnesses:
 GEO. MESTRAL,
 EDWARD P. MACLEAN.